US012645174B2

(12) United States Patent
Takeuchi et al.

(10) Patent No.: US 12,645,174 B2
(45) Date of Patent: Jun. 2, 2026

(54) FIXING DEVICE

(71) Applicant: CANON KABUSHIKI KAISHA, Tokyo (JP)

(72) Inventors: Suguru Takeuchi, Chiba (JP); Kengo Koyama, Chiba (JP); Ayano Saito, Chiba (JP); Shigeru Tanaka, Tokyo (JP); Yasuharu Toratani, Chiba (JP); Akiyoshi Shinagawa, Saitama (JP); Shuhei Yasuda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/757,665

(22) Filed: Jun. 28, 2024

(65) Prior Publication Data

US 2025/0021035 A1 Jan. 16, 2025

(30) Foreign Application Priority Data

Jul. 13, 2023 (JP) ................................ 2023-115502

(51) Int. Cl.
*G03G 15/20* (2006.01)

(52) U.S. Cl.
CPC ..... *G03G 15/2053* (2013.01); *G03G 15/2064* (2013.01); *G03G 2215/2032* (2013.01)

(58) Field of Classification Search
CPC ........... G03G 15/2017; G03G 15/2039; G03G 15/2053; G03G 2215/2003
See application file for complete search history.

(56) References Cited

U.S. PATENT DOCUMENTS

2021/0356888 A1* 11/2021 Chikugo ............ G03G 15/2053

FOREIGN PATENT DOCUMENTS

JP 2005031562 A 2/2005
JP 2021140038 A * 9/2021

OTHER PUBLICATIONS

JP 2021140038 English machine translation, Tanaka et al., Sep. 16, 2021 (Year: 2021).*

* cited by examiner

*Primary Examiner* — Thomas S Giampaolo, II
(74) *Attorney, Agent, or Firm* — ROSSI, KIMMS & McDOWELL LLP

(57) ABSTRACT

A fixing device includes a belt member, a heating roller stretching the belt member, a steering roller stretching the belt member and a cover member. The steering roller controls a position of the belt member with respect to a rotation axis direction of the heating roller by tilting with respect to the rotation axis direction. The cover member is disposed with a gap from the belt member in such a manner as to cover a part of an outer side of the belt member. A distance between the cover member and the belt member in a first stretched region stretched by the steering roller is larger than a distance between the cover member and the belt member in a second stretched region stretched by the heating roller in a case where the steering roller is parallel to the heating roller.

10 Claims, 7 Drawing Sheets

FIG.6

| | WHETHER FIXING BELT AND COVER MEMBER CONTACTED | POWER REDUCTION EFFECT |
|---|---|---|
| COMPARATIVE EXAMPLE 1 | CONTACTED | 200W |
| COMPARATIVE EXAMPLE 2 | CONTACTED | 160W |
| COMPARATIVE EXAMPLE 3 | NOT CONTACTED | 130W |
| EXAMPLE | NOT CONTACTED | 162W |

FIXING DEVICE

BACKGROUND OF THE INVENTION

Field of the Invention

The present invention relates to a fixing device that fixes a toner image borne on a recording material to the recording material.

Description of the Related Art

An image forming apparatus includes a fixing device that fixes a toner image borne on a recording material to the recording material. In the fixing device, the toner image borne on the recording material is conveyed while being heated in a nip portion formed by a heating member and a nip portion forming member. JP 2005-31562 A discloses a configuration in which a partition plate is provided between a casing of a fixing device and a heating member to enhance a heat insulation effect of the fixing device.

Here, as described in JP 2005-31562 A, by providing the partition plate between the heating member and the casing, it is possible to suppress the heat radiation of the heating member to some extent. In order to achieve the power saving of the fixing device, it is preferable to enhance the heat radiation suppressing effect of the heating member. To this end, it is preferable to bring the partition plate close to the heating member. In the configuration described in JP 2005-31562 A, the heating member is a roller. However, a configuration in which the heating member is a belt member has also been conventionally known.

The belt member is stretched by a plurality of stretching rollers. In addition, in a case where the heating member is the belt member, in order to control the position of the belt member in the rotation axis direction of the stretching rollers, one of the plurality of stretching rollers tilts with respect to the other stretching rollers in many cases. The roller tilting to control the position of the belt member in this manner is referred to as a steering roller. As described above, it is preferable to bring the partition plate close to the heating member in order to enhance the heat radiation suppressing effect of the heating member. However, in a case where the heating member is the belt member, the steering roller tilts. Thus, if the partition plate is too close to the belt member, the belt member and the partition plate interfere with each other when the steering roller tilts.

SUMMARY OF THE INVENTION

The present invention provides a configuration capable of suppressing heat radiation from a belt member even in a configuration in which the belt member is adopted in a fixing device.

According to one aspect of the present invention, a fixing device that fixes a toner image to a recording material by heating the toner image borne on the recording material, the fixing device includes a rotatable endless belt member, a heating roller disposed inside the belt member, and configured to stretch the belt member and heat the belt member, a steering roller disposed inside the belt member, and configured to stretch the belt member together with the heating roller and control a position of the belt member with respect to a rotation axis direction of the heating roller by tilting with respect to the rotation axis direction, a nip portion forming member contacting an outer peripheral surface of the belt member, and configured to form a nip portion for nipping and conveying the recording material between the nip portion forming member and the belt member, and, a cover member disposed with a gap from the belt member in such a manner as to cover a part of an outer side of the belt member. The belt member has a region in which a distance from the cover member changes in a case where the steering roller tilts with respect to the heating roller and the region includes a first stretched region stretched by the steering roller and a second stretched region stretched by the heating roller. A distance between the cover member and the belt member in the first stretched region is larger than a distance between the cover member and the belt member in the second stretched region in a case where the steering roller is parallel to the heating roller.

Further features of the present invention will become apparent from the following description of exemplary embodiments with reference to the attached drawings.

BRIEF DESCRIPTION OF THE DRAWINGS

FIG. 6 is a table illustrating a relationship of whether the fixing belt and the cover member are in contact with each other with a power reduction amount in each of the comparative examples and the example.

DESCRIPTION OF THE EMBODIMENTS

Figure 1:
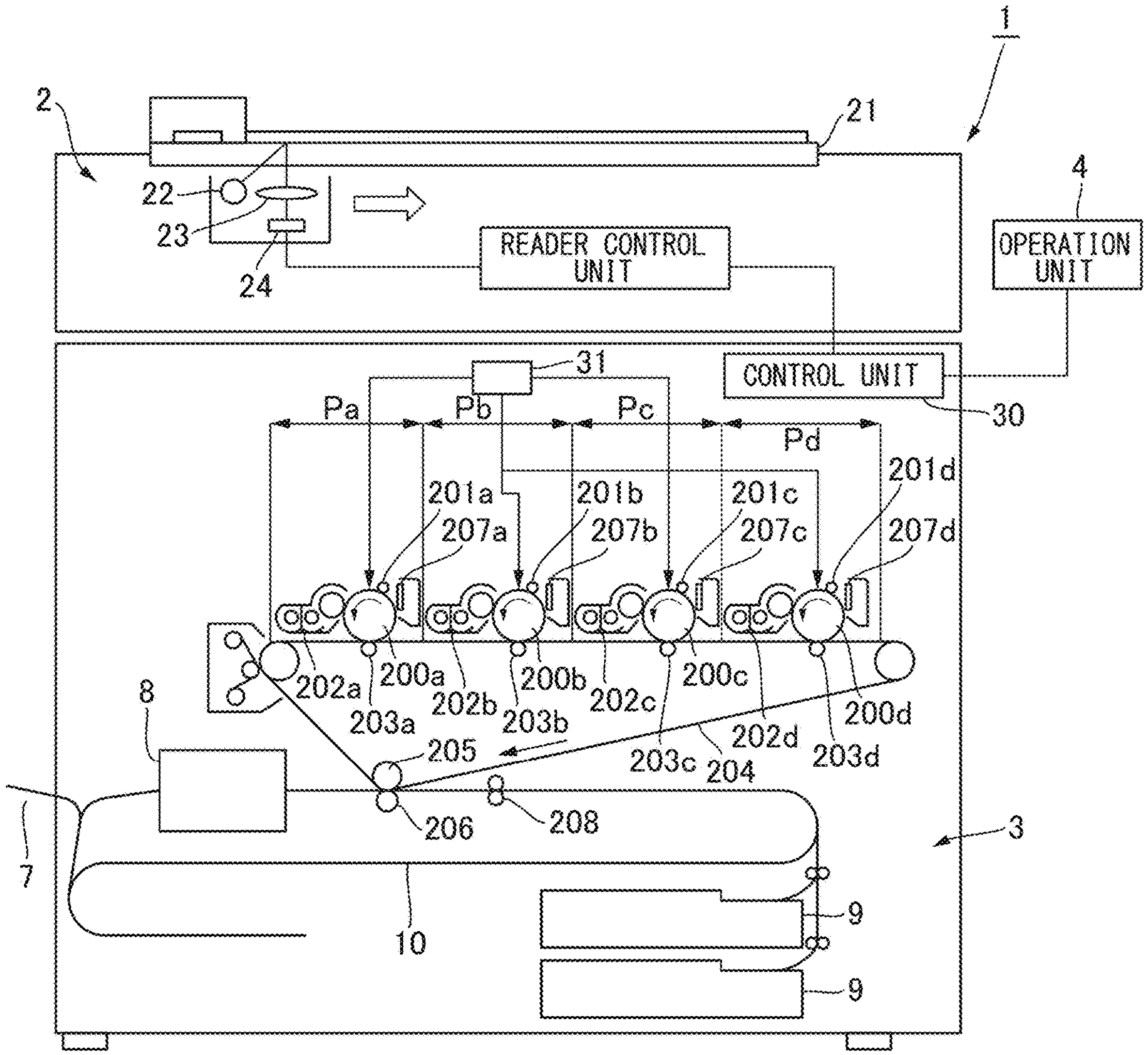
FIG. 1 is a schematic cross-sectional view illustrating a configuration of an image forming apparatus according to an embodiment.

An embodiment will be described with reference to FIGS. 1 to 7. First, a schematic configuration of an image forming apparatus according to the present embodiment will be described with reference to FIG. 1.

Image Forming Apparatus

The image forming apparatus 1 is an electrophotographic full-color printer including four image forming units Pa, Pb, Pc, and Pd provided to correspond to four colors of yellow, magenta, cyan, and black. In the present embodiment, the image forming units Pa, Pb, Pc, and Pd are arranged in a tandem type along a rotation direction of an intermediate transfer belt 204 to be described below. The image forming apparatus 1 forms a toner image (image) on a recording material according to an image signal from an image reading unit (document reading device) 2 connected to an image forming apparatus body 3 or a host device such as a personal computer communicably connected to the image forming apparatus body 3. Examples of the recording material include sheet materials such as paper, a plastic film, and cloth.

The image forming apparatus 1 includes an image reading unit 2 and an image forming apparatus body 3. The image reading unit 2 reads a document placed on a platen glass 21. Light emitted from a light source 22 is reflected by the document, and an image is formed on a CCD sensor 24 via an optical system member 23 such as a lens. Such an optical system unit converts the document into an electric signal data string for each line by scanning the document in an arrow direction. The image signal obtained by the CCD sensor 24 is sent to the image forming apparatus body 3, and a control unit 30 performs image processing in accordance with each image forming unit to be described below. The control unit 30 also receives an external input from an external host device such as a print server as an image signal.

The image forming apparatus body 3 includes a plurality of image forming units Pa, Pb, Pc, and Pd, and each of the image forming unit forms an image based on the above-described image signal. That is, the image signal is converted into a laser beam subjected to pulse width modulation (PWM) by the control unit 30. A polygon scanner 31 serving as an exposing unit scans the laser beam corresponding to the image signal. Then, photosensitive drums 200*a* to 200*d* which serve as image bearing members of the image forming units Pa to Pd are irradiated with a laser beam.

Note that Pa, Pb, Pc, and Pd, which denote an image forming unit for yellow (Y), an image forming unit for magenta (M), an image forming unit for cyan (C), and an image forming unit for black (Bk), respectively, form images of corresponding colors. Since the image forming units Pa to Pd are substantially the same, the image forming unit Pa for Y will be described in detail below, and the description of the other image forming units will be omitted. In the image forming unit Pa, a toner image is formed on a surface of the photosensitive drum 200*a* based on the image signal as will be described below.

A charging roller 201*a* serving as a primary charger charges the surface of the photosensitive drum 200*a* to a predetermined potential to prepare for forming an electrostatic latent image. An electrostatic latent image is formed on the surface of the photosensitive drum 200*a* charged to the predetermined potential by a laser beam from the polygon scanner 31. A developing unit 202*a* develops the electrostatic latent image on the photosensitive drum 200*a* to form a toner image. A primary transfer roller 203*a* performs discharging from a back surface of the intermediate transfer belt 204, applies a primary transfer bias having a polarity opposite to that of the toner, and transfers the toner image on the photosensitive drum 200*a* onto the intermediate transfer belt 204. After the transfer, the surface of the photosensitive drum 200*a* is cleaned by a cleaner 207*a*.

In addition, the toner image on the intermediate transfer belt 204 is conveyed to the next image forming unit, and toner images for the respective colors formed by the respective image forming units are sequentially transferred in the order of Y, M, C, and Bk, and images of four colors are formed on the surface thereof. Then, the toner image having passed through the image forming unit Pd for Bk located on the most downstream side in the rotation direction of the intermediate transfer belt 204 is conveyed to a secondary transfer portion including a pair of secondary transfer rollers 205 and 206. Then, in the secondary transfer portion, a secondary transfer electric field having a polarity opposite to that of the toner images on the intermediate transfer belt 204 is applied, thereby secondarily transferring the toner images to the recording material.

The recording material is accommodated in a cassette 9, and the recording material fed from the cassette 9 is conveyed to, for example, a registration portion 208 including a pair of registration rollers, and stands by at the registration portion 208. Thereafter, the registration portion 208 conveys the recording material to the secondary transfer portion at a timing controlled to align the toner images on the intermediate transfer belt 204 and the paper.

The recording material to which the toner images have been transferred by the secondary transfer portion is conveyed to a fixing device 8, and the toner images borne on the recording material are fixed to the recording material by being heat-pressurized in the fixing device 8. The recording material having passed through the fixing device 8 is discharged to a sheet discharge tray 7. Note that, in a case where images are formed on both surfaces of the recording material, when toner images are transferred and fixed to a first surface (front surface) of the recording material, the front and back surfaces of the recording material are reversed via a reverse conveyance portion 10, toner images are transferred and fixed to a second surface (back surface) of the recording material, and the recording material is placed on the sheet discharge tray 7.

Note that the control unit 30 controls the entire image forming apparatus 1 as described above. Furthermore, the control unit 30 can perform various settings and the like based on an input from an operation unit 4 included in the image forming apparatus 1. The control unit 30 includes a central processing unit (CPU), a read only memory (ROM), and a random access memory (RAM). The CPU controls each unit while reading a program corresponding to the control procedure stored in the ROM. In addition, work data and input data are stored in the RAM, and the CPU performs control with reference to the data stored in the RAM based on the above-described program or the like.

Fixing Device

Figure 2:
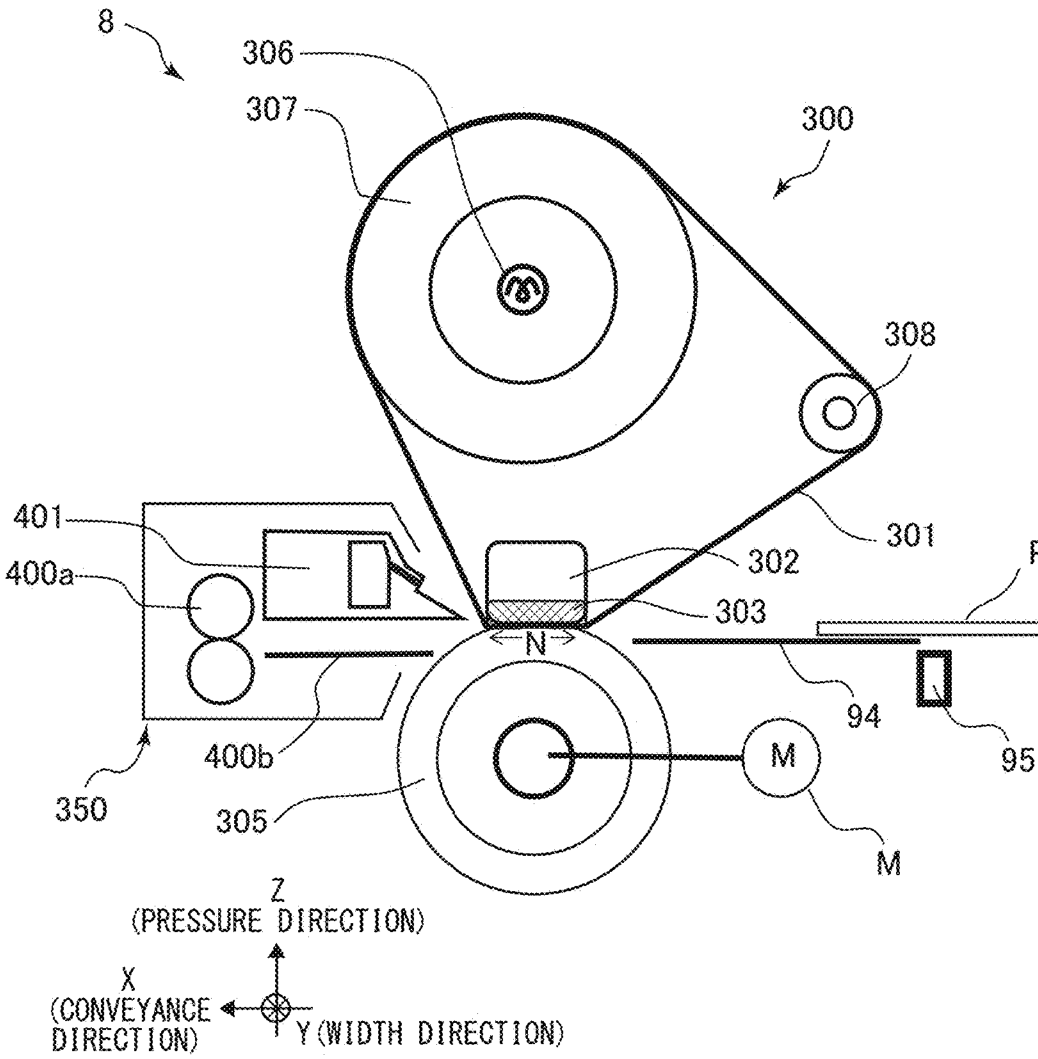
FIG. 2 is a schematic cross-sectional view illustrating a configuration of a fixing device according to the embodiment.

Next, a configuration of the fixing device 8 according to the present embodiment will be described with reference to FIG. 2. FIG. 2 is a cross-sectional view schematically illustrating a schematic configuration of the fixing device 8. In FIG. 2, a cover member 500 to be described below is omitted. In the present embodiment, a belt heating type fixing device using an endless belt is adopted. In FIG. 2, an X direction represents a conveyance direction of the recording material P, a Y direction represents a width direction intersecting (in the present embodiment, orthogonal to) the conveyance direction of the recording material P, and a Z direction represents a pressure direction of a pressure roller 305 to be described below. These directions are orthogonal to each other. Further, one side in the width direction (Y direction) is a front side of the image forming apparatus 1, for example, a side on which the operation unit 4 is disposed and operated by a user. On the other hand, the other side in the width direction is a back side of the image forming apparatus 1.

The fixing device 8 includes a heating unit 300 having a fixing belt 301 serving as an endless rotatable belt member, and a pressure roller 305 serving as a nip portion forming member and a pressure rotary member that contact the fixing belt 301 and form a nip portion N together with the fixing belt 301.

The heating unit 300 includes the fixing belt 301 described above, a fixing pad 303 serving as a pad member, a heating roller 307, and a steering roller 308. The pressure roller 305 is also a driving rotary member that rotates in contact with an outer peripheral surface of the fixing belt 301 to apply a driving force to the fixing belt 301.

The fixing belt 301 serving as a heating member (a fixing member) and a rotary member has thermal conductivity, heat resistance, and the like, and has a thin cylindrical shape. In the present embodiment, the fixing belt 301 has a three-layer structure in which a base layer, an elastic layer on the outer periphery of the base layer, and a release layer on the outer periphery of the elastic layer are formed. Further, a polyimide resin (PI) is used as a material for the base layer having a thickness of 80 μm, a silicone rubber is used for the elastic layer having a thickness of 300 μm, and PFA (tetrafluoroethylene/perfluoroalkoxyethylene copolymer resin) is used as a fluororesin for the release layer having a thickness of 30 μm. The fixing belt 301 is stretched by the fixing pad 303, the heating roller 307, and the steering roller 308.

The fixing pad 303 serving as a contact member is disposed inside the fixing belt 301 so as to face the pressure roller 305 with the fixing belt 301 interposed therebetween, and is in contact with an inner peripheral surface of the fixing belt 301. The fixing pad 303 forms the nip portion N for nipping and conveying the recording material between the fixing belt 301 and the pressure roller 305. In the present embodiment, the fixing pad 303 is a substantially plate-like member that is long along the width direction of the fixing belt 301 (a longitudinal direction intersecting with the rotation direction of the fixing belt 301 and a rotation axis direction of the heating roller 307). The nip portion N is formed by pressing the fixing pad 303 against the pressure roller 305 with the fixing belt 301 interposed therebetween. As a material for the fixing pad 303, a liquid crystal polymer (LCP) resin is used.

The fixing pad 303 is supported by a stay 302 serving as a support member disposed inside the fixing belt 301. That is, the stay 302 is disposed on a side of the fixing pad 303 opposite to the pressure roller 305 to support the fixing pad 303. The stay 302, which is a reinforcing member having rigidness and a long length along the longitudinal direction of the fixing belt 301, contacts the fixing pad 303 to support the fixing pad 303 from the back. That is, when the fixing pad 303 is pressed against the pressure roller 305, the stay 302 imparts strength to the fixing pad 303 to secure the pressurizing force in the nip portion N.

A lubricating sheet (not illustrated) is interposed between the fixing pad 303 and the fixing belt 301. A lubricant is applied to the inner peripheral surface of the fixing belt 301, so that the fixing belt 301 smoothly slides with respect to the fixing pad 303 covered with the lubricating sheet. As the lubricant, silicone oil is used.

The heating roller 307 is disposed inside the fixing belt 301 to stretch the fixing belt 301 together with the fixing pad 303 and the steering roller 308. The heating roller 307 is formed of metal such as aluminum or stainless steel in a cylindrical shape, and a halogen heater 306 serving as a heating portion for heating the fixing belt 301 is disposed inside the heating roller 307. Then, the heating roller 307 is heated to a predetermined temperature by the halogen heater 306.

In the present embodiment, the heating roller 307 is formed of, for example, a stainless steel pipe having a thickness of 1 mm. One or more halogen heaters 306 may be installed. Note that the heating portion is not limited to the halogen heater, and may be another heater capable of heating the heating roller 307, such as a carbon heater. The fixing belt 301 is heated by the heating roller 307 heated by the halogen heater 306, and is controlled to a predetermined target temperature corresponding to the type of recording material based on a temperature detected by a thermistor (not illustrated).

The steering roller 308 is disposed inside the fixing belt 301, stretches the fixing belt 301 together with the fixing pad 303 and the heating roller 307, and rotates following the rotation of the fixing belt 301. The steering roller 308 tilts with respect to the rotation axis direction (width direction or longitudinal direction) of the heating roller 307 to control the position (shifted position) of the fixing belt 301 with respect to the rotation axis direction. That is, the steering roller 308 has a pivot at the center or one end of the steering roller 308 in the rotation axis direction (longitudinal direction), and swings about the pivot to tilt with respect to the longitudinal direction of the heating roller 307. As a result, a tension difference is generated between one side and the other side of the fixing belt 301 in the longitudinal direction, thereby moving the fixing belt 301 in the longitudinal direction.

The fixing belt 301 is shifted toward one end portion during rotation depending on the accuracy in the outer diameter of the roller stretching the fixing belt 301, the accuracy in the alignment between the rollers, and the like. Therefore, such a shift is controlled by the steering roller 308. The steering roller 308 may be swung by a drive source such as a motor, or may be configured to swing by self-alignment.

In the present embodiment, the steering roller 308 is also a tension roller biased by a spring supported by a frame of the heating unit 300 to apply a predetermined tension to the fixing belt 301. Further, the steering roller 308 is formed of metal such as aluminum or stainless steel in a cylindrical shape. In the present embodiment, the steering roller 308 is formed of a hollow stainless steel pipe having an outer diameter of 20 mm. A rubber material or the like may be provided on the surface of the steering roller 308 in order to increase the grip force with respect to the fixing belt 301.

The pressure roller 305 serving as a nip portion forming member rotates in contact with the outer peripheral surface of the fixing belt 301 to apply a driving force to the fixing belt 301. Further, the pressure roller 305 is pressed against the fixing belt 301 to form the nip portion N between the fixing belt 301 and the pressure roller 305. In the present embodiment, the pressure roller 305 is a roller in which an elastic layer is formed on an outer periphery of a shaft and a releasable layer is formed on an outer periphery of the elastic layer. Further, stainless steel having a diameter of 72 mm is used for the shaft, conductive silicone rubber having a thickness of 8 mm is used for the elastic layer, and PFA (tetrafluoroethylene/perfluoroalkoxyethylene copolymer resin) is used as a fluororesin having a thickness of 100 μm for the releasable layer. The pressure roller 305 is rotatably supported by a fixing frame (not illustrated) of the fixing device 8, with one end to which a gear is fixed, and is connected to a motor M serving as a pressure roller driving source via the gear to be rotationally driven.

In the fixing device 8 configured as described above, a toner image is heated while the recording material P bearing the toner image is conveyed in a nipped state in the nip portion N formed between the fixing belt 301 and the pressure roller 305. Then, the toner image is fixed to the recording material P. Therefore, the fixing device 8 needs to have both a function of applying heat and pressure and a function of conveying the recording material P. The pressure roller 305 is pressed against the fixing pad 303 via the fixing belt 301 by a driving source (not illustrated). In the present embodiment, the pressurizing force (NF) in the nip portion N for forming an image is set to 1600 N, the length of the nip portion N in the X direction (conveyance direction) is set to 24.5 mm, and the length of the nip portion N in the Y direction (width direction) is set to 326 mm.

Further, a discharge unit 350 for discharging the recording material P having passed through the nip portion N to the outside of the fixing device 8 is disposed downstream of the nip portion N in the conveyance direction of the recording material P. In the discharge unit 350, an air nozzle 401, a sheet discharge roller pair 400*a*, and a lower separation guide 400*b* are disposed. The air nozzle 401 blows out air (compressed air) for separating the recording material P from the fixing belt 301. Specifically, the air nozzle 401 is disposed downstream of the nip portion N in the conveying direction of the recording material (which may hereinafter be simply referred to as "the conveyance direction") and above the nip portion N in the vertical direction to blow air upstream in the conveying direction and downward in the vertical direction. Then, the recording material Pis separated from the fixing belt 301 by blowing air to the vicinity of the leading end of the recording material P after passing through the nip portion N.

The lower separation guide 400*b* is disposed downstream of the nip portion N in the conveyance direction of the recording material and below the nip portion N in the vertical direction, with a distal end facing the pressure roller 305 near the nip portion N. Then, when the recording material P sticks to the pressure roller 305, the lower separation guide 400*b* separates the recording material P from the pressure roller 305. Further, the lower separation guide 400*b* supports a lower surface of the recording material P discharged from the nip portion N and guides the recording material P to the sheet discharge roller pair 400*a*. The sheet discharge roller pair 400*a* discharges the recording material P discharged from the nip portion N to the outside of the fixing device 8. In the present embodiment, the sheet discharge roller pair 400*a* is disposed downstream of the nip portion N by about 40 mm in the conveyance direction.

Further, a guide unit 94 for guiding the recording material P to the nip portion N and a detection sensor 95 for detecting the recording material P immediately before the nip portion N are disposed upstream of the nip portion N of the fixing device 8 in the conveyance direction. The control unit 30 detects a timing at which the recording material P enters the nip portion N using the detection sensor 95.

Tilt of Steering Roller

Figure 3A:
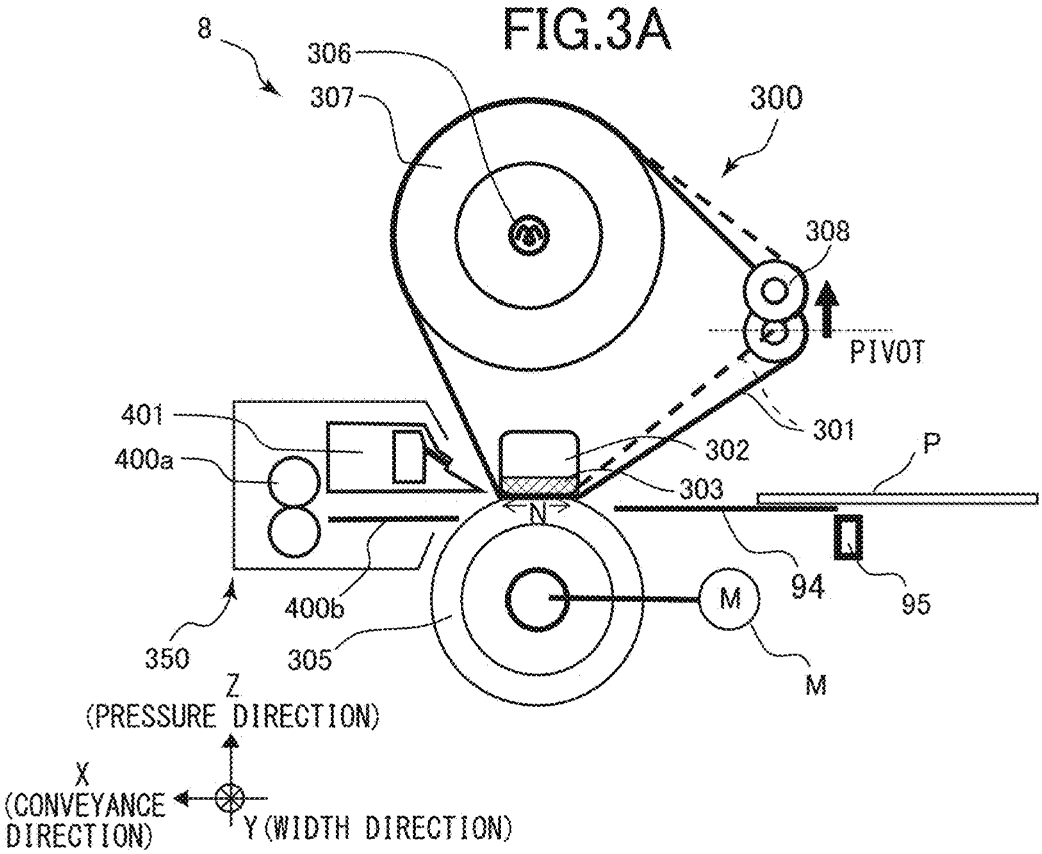
FIG. 3A is a schematic view illustrating a case where one end of a steering roller tilts upward in the cross-sectional view of the fixing device according to the embodiment.
Figure 3B:
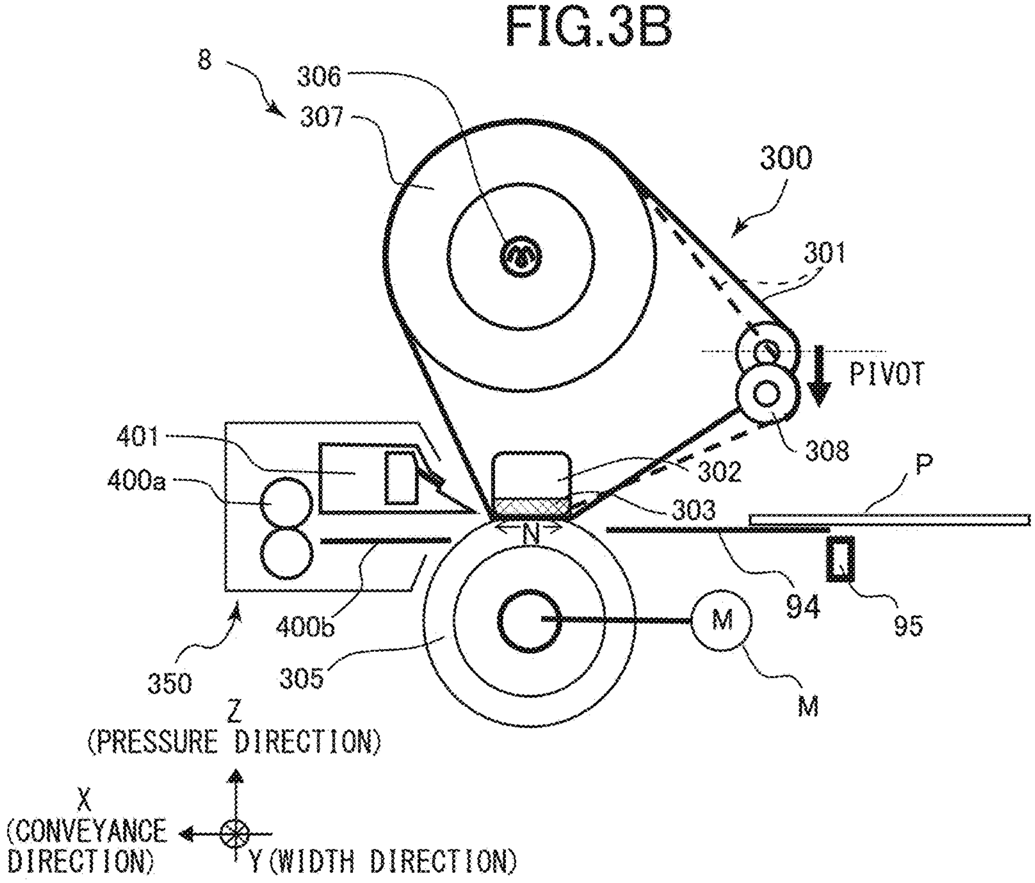
FIG. 3B is a schematic view illustrating a case where the other end of the steering roller tilts downward in the cross-sectional view of the fixing device according to the embodiment.

A tilt of the steering roller 308 when the shifted position of the fixing belt 301 is controlled (shift control) by the steering roller 308 will be described with reference to FIGS. 3A and 3B. In the present embodiment, the steering roller 308 tilts in the vertical direction illustrated in FIGS. 2, 3A, and 3B about the pivot to perform a shift control. When the steering roller 308 tilts upward at one end in the Y direction as illustrated in FIG. 3A, the steering roller 308 tilts downward at the other end in the Y direction as illustrated in FIG. 3B. Then, the steering roller 308 tilts in such a manner as to alternately repeat the states of FIGS. 3A and 3B, whereby the shifted position of the fixing belt 301 is controlled.

Cover Member

Figure 4:
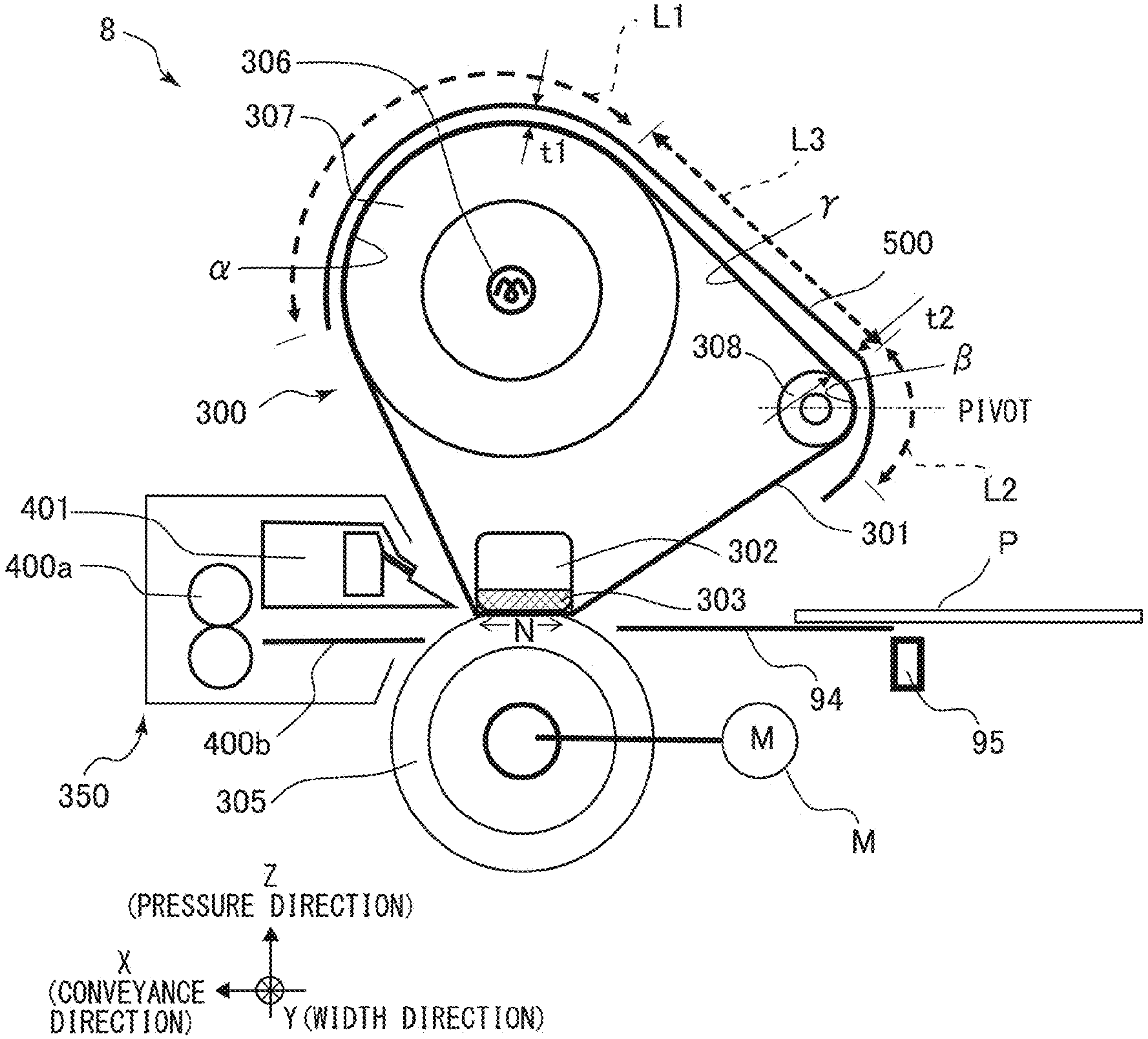
FIG. 4 is a schematic cross-sectional view illustrating a configuration in which a cover member is disposed near the fixing device according to the embodiment.

As described above, in order to save power in the fixing device 8, it is preferable to suppress heat radiation from the fixing belt 301. Therefore, as illustrated in FIG. 4, the fixing device 8 according to the present embodiment includes a cover member 500 as a member that suppresses such heat radiation. The cover member 500 is disposed to cover a part of an outer side of the fixing belt 301 with a gap from the fixing belt 301. The cover member 500 in the present embodiment uses a liquid crystal polymer (LCP) having a thickness of 2 mm. The cover member 500 is a plate-like member formed of a resin member or a metal member having heat resistance. Such a cover member 500 may be a resin or foam member other than the LCP, or may be a metal member such as iron, stainless steel, or copper. In addition, a reflection sheet or the like may be attached to a side of the cover member 500 facing the fixing belt 301.

As illustrated in FIG. 4, the cover member 500 is disposed from a heating roller facing portion (second portion) L1 facing a first region (second stretched region) α of the fixing belt 301 stretched by the heating roller 307 to a steering roller facing portion (first portion) L2 facing a second region (first stretched region) β of the fixing belt 301 stretched by the steering roller 308. The fixing belt 301 has a third region (third stretched region) γ between the first region α and the second region β in the rotation direction of the fixing belt 301. A portion (third portion) L3 facing the third region γ is a portion connecting the heating roller facing portion L1 and the steering roller facing portion L2 to each other. The cover member 500 is disposed over the heating roller facing portion L1, the portion L3 facing the third region γ, and the steering roller facing portion L2. The cover member 500 in the present embodiment is disposed in such a manner that the fixing device 8 is not visible due to the cover member 500 when the fixing device 8 is viewed from above in the vertical direction. In the first region α, the cover member 500 may be formed in an arc shape parallel to the arc shape of the heating roller 307. In the second region β, the cover member 500 does not have an arc shape parallel to the arc shape of the steering roller 308, but has a shape that prevents the fixing belt 301 from hitting the cover member 500 even though the steering roller 308 tilts. Specifically, the cover member 500 in the second region β may be formed in an arc shape, or may be formed in a shape corresponding to a trajectory along which the steering roller 308 tilts.

Here, the first region α is a region where the inner peripheral surface of the fixing belt 301 and the outer peripheral surface of the heating roller 307 are in contact with each other, and the second region β is a region where the inner peripheral surface of the fixing belt 301 and the outer peripheral surface of the steering roller 308 are in contact with each other. In addition, the third region γ is a region upstream of the steering roller 308 and downstream of the heating roller 307 in the rotation direction of the fixing belt 301, and is a region away from the fixing pad 303.

The region where the cover member 500 covers the fixing belt 301 may include at least regions facing the first region α and the second region β, and for example, the cover member 500 may be omitted in a region facing the third region γ. However, from the viewpoint of suppressing the heat radiation of the fixing belt 301, it is preferable to cover the periphery of the fixing belt 301 with the cover member 500 as much as possible. In the present embodiment, the outer side of the fixing belt 301 is covered with the cover member 500 on the side opposite to the pressure roller 305. In particular, in the present embodiment, since the fixing belt 301 is located above the pressure roller 305, the cover member 500 is disposed to cover a region above the fixing belt 301. Note that the cover member 500 may cover the fixing belt 301 in a range wider than the above-described region without interfering with the conveyance of the recording material P to the nip portion N or the discharge unit 350.

In addition, it is preferable that the cover member 500 covers the fixing belt 301 in a range as wide as possible in the width direction (Y direction) of the fixing belt 301, and it is more preferable that the cover member 500 covers the entire region in the width direction of the fixing belt 301. Furthermore, the length in the width direction of the cover member 500 may be longer than the length in the width direction of the fixing belt 301, so that the cover member 500 may protrude from both ends in the width direction of the fixing belt 301. That is, the cover member 500 is preferably larger than the fixing belt 301 in the width direction. However, even if the cover member 500 does not cover the entire region in the width direction of the fixing belt 301, the heat radiation suppressing effect can be obtained as long as at least a part of the fixing belt 301 is covered. The cover member 500 is preferably disposed to cover ¼ or more of the circumferential length of the fixing belt 301. Furthermore, the cover member 500 may be constituted by one member, or may be constituted by a plurality of members.

In a case where the cover member 500 is formed to be longer than the fixing belt 301 in the width direction, it is preferable to set the length of the cover member 500 in consideration of the movement range of the fixing belt 301 in the width direction. The fixing belt 301 moves by a predetermined distance in the width direction as the steering roller is swung. When the length of the cover member 500 is longer than the sum of the predetermined distance and the length of the fixing belt 301, heat is hardly released.

The cover member 500 is disposed with a gap from the fixing belt 301 as described above. The cover member 500 is preferably disposed as close to the fixing belt 301 as possible from the viewpoint of suppressing the heat radiation of the fixing belt 301. However, as described with reference to FIGS. 3A and 3B, the steering roller 308 that stretches the fixing belt 301 tilts with respect to the rotation axis direction of the heating roller 307 in order to perform a shift control of the fixing belt 301. Therefore, the trajectory of the fixing belt 301 changes with the tilt of the steering roller 308. That is, when the steering roller 308 tilts with respect to the heating roller 307, the fixing belt 301 has a region where the distance from the cover member 500 changes. Therefore, at least in the steering roller facing portion L2 facing the second region β of the fixing belt 301 stretched by the steering roller 308, it is difficult to dispose the cover member 500 close to the fixing belt 301.

Therefore, in the present embodiment, when the steering roller 308 is parallel to the heating roller 307, a distance between the cover member 500 and the fixing belt 301 in the region (the second region β) stretched by the steering roller 308 is set to be larger than a distance between the cover member 500 and the fixing belt 301 in the region (the first region α) stretched by the heating roller 307. In particular, the cover member 500 is disposed in such a manner that an average distance t2 between the cover member 500 and the second region β of the fixing belt 301 is larger than an average distance t1 between the cover member 500 and the first region α of the fixing belt 301 (t1<t2). That is, the distance between the steering roller facing portion L2 of the cover member 500 and the fixing belt 301 is set to be large, and the distance between the heating roller facing portion L1 of the cover member 500 and the fixing belt 301 is set to be small. As a result, even though the steering roller 308 tilts, both prevention of interference between the cover member 500 and the fixing belt 301 and suppression of heat radiation from the fixing belt 301 can be achieved.

In particular, the heating roller 307 is a roller that has a halogen heater 306, which is a heat source, therein to heat the fixing belt 301. Therefore, the heat radiation amount is larger in the first region α of the fixing belt 301 stretched by the heating roller 307 than in the second region β of the fixing belt 301 stretched by the steering roller 308. For this reason, by disposing the cover member 500 close to the first region α, heat radiation from the first region α can be efficiently suppressed, and the power saving of the fixing device 8 can be easily achieved.

In the present embodiment, the distance between the fixing belt 301 and the cover member 500 in the heating roller facing portion L1 is substantially uniform over the entire region where the cover member 500 and the first region α of the fixing belt 301 face each other, and is, for example, 3 mm. Note that it is not required that the distance between the fixing belt 301 and the cover member 500 in the heating roller facing portion L1 is uniform in the entire region where the cover member 500 and the first region α face each other, and it is only required that the average distance t1 in the entire region where the cover member 500 and the first region α face each other may be smaller than the average distance t2 in the entire region where the cover member 500 and the second region β face each other.

On the other hand, the distance between the fixing belt 301 and the cover member 500 in the steering roller facing portion L2 is set to a maximum of 8 mm. This is a distance at which the cover member 500 can be brought as close to the fixing belt 301 as possible, while the fixing belt 301 and the cover member 500 are not brought into contact with each other even though the steering roller 308 tilts. That is, a portion of the cover member 500 where the distance is largest is a portion located in the tilting direction of the steering roller 308. In other words, a position of the fixing belt 301 where the distance between the cover member 500 and the fixing belt 301 in the region stretched by the steering roller 308 is larger than the distance between the cover member 500 and the fixing belt 301 in the region stretched by the heating roller 307 in a case of the steering roller 308 is parallel to the heating roller 307 is a position of the fixing belt 301 stretched by the steering roller 308 at the position at which the steering roller 308 tilts most when the steering roller 308 tilts most. In the present embodiment, the tilting distance of the steering roller 308 (the distance by which one end in the Y direction moves in the tilting direction) is set to a maximum of 5 mm. Therefore, when the steering roller 308 tilts the most, the distance between the fixing belt 301 and the cover member 500 in the steering roller facing portion L2 becomes equal to the distance of 3 mm between the fixing belt 301 and the cover member 500 in the heating roller facing portion L1.

As described above, in the present embodiment, the distance between the cover member 500 and the second region β is largest in the tilting direction of the steering roller 308 (the vertical direction in FIG. 4), and the cover member 500 is close to the second region β in the other portion. That is, the distance between the outer side of the fixing belt 301 (the right side of the steering roller 308 in FIG. 4) in a direction (the left-right direction in FIG. 4) orthogonal to each of the tilting direction of the steering roller 308 and the rotation axis direction of the steering roller 308 and the cover member 500 is set to be smaller than each of the distances between both sides (the upper and lower sides of the steering roller 308 in FIG. 4) of the fixing belt 301 in the tilting direction of the steering roller 308 and the cover member 500.

The distance between the fixing belt 301 and the cover member 500 in the steering roller facing portion L2 may be a substantially uniform distance (for example, 8 mm) in the entire region where the cover member 500 and the second region β of the fixing belt 301 face each other. However, as in the present embodiment, it is preferable to dispose the cover member 500 close to the fixing belt 301, in an area deviated from the tilting direction of the steering roller 308 within the second region β of the fixing belt 301, to the extent that the cover member 500 and the fixing belt 301 do not interfere with each other when the steering roller 308 tilts. As a result, it is possible to efficiently suppress heat radiation from the second region β.

Further, taking into account the variation in the tilting distance of the steering roller 308, the distance between the fixing belt 301 and the cover member 500 in the steering roller facing portion L2 may be larger than 8 mm, which is described above. In any case, it is only required that the distance between the fixing belt 301 and the cover member 500 in the steering roller facing portion L2 is appropriately set depending on the tilting distance of the steering roller 308 such that the fixing belt 301 and the cover member 500 do not come into contact with each other. However, it is preferable that the cover member 500 is disposed in such a manner that the distance from the fixing belt 301 is 10 mm or less. That is, from the viewpoint of suppressing heat radiation from the fixing belt 301, the distance (the largest distance) between the cover member 500 and the fixing belt 301 at a portion where they are farthest away from each other is preferably 10 mm or less.

Here, the average distances t1 and t2 indicate an average distance of the entire heating roller facing portion L1 and an average distance of the entire steering roller facing portion L2, respectively. However, in a case where a hole is form in the cover member 500, the average distance is calculated excluding the hole. Further, the average distance t2 in the steering roller facing portion L2 is a distance when the steering roller 308 is located at the pivot (tilting center) position.

In the present embodiment, the portion L3 facing the third region γ is inclined with respect to the outer peripheral surface of the fixing belt 301 in the third region γ, in the cross section orthogonal to the rotation axis of the heating roller 307, in such a manner that the distance from the fixing belt 301 to the portion L3 increases as the portion L3 goes in a direction from the position facing the first region α toward the position facing the second region β. As described above, the average distance t2 in the steering roller facing portion L2 of the cover member 500 is larger than the average distance t1 in the heating roller facing portion L1 of the cover member 500. In the present embodiment, the steering roller facing portion L2 and the heating roller facing portion L1, which are different in the distance from the fixing belt 301 as described above, are smoothly connected by inclining the portion L3 facing the third region γ with respect to the outer peripheral surface of the fixing belt 301. For example, the portion L3 facing the third region γ has a linear cross section.

Here, the portion L3 facing the third region γ may be formed, for example, in a stepwise shape, to change the distance from the fixing belt 301 stepwise. However, taking into account the workability of the cover member 500, it is preferable that the portion L3 facing the third region γ has a linear cross section (flat plate shape) as in the present embodiment.

Power Reduction Effect of Distance Between Fixing Belt and Cover Member

Figure 5:
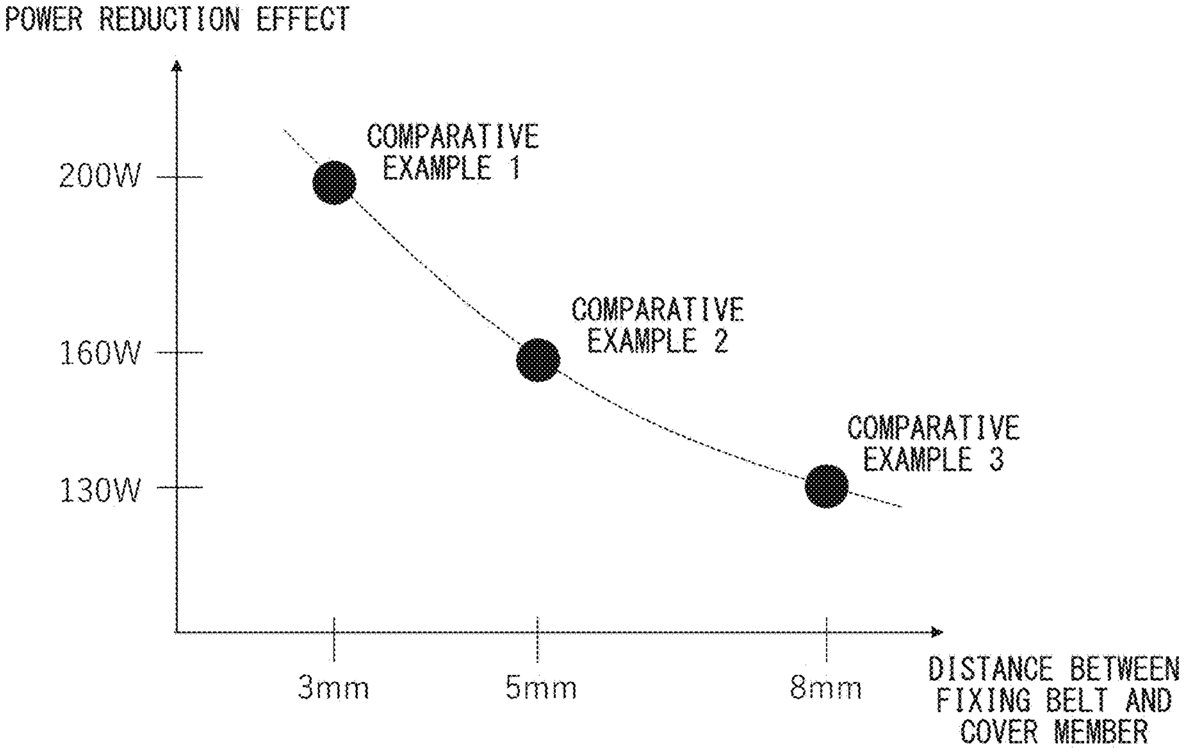
FIG. 5 is a graph illustrating a relationship of a distance between a fixing belt and a cover member with a power reduction amount.

Next, a relationship of a distance between the fixing belt 301 and the cover member 500 with a power reduction effect in the fixing device 8 will be described. FIG. 5 is a graph illustrating a result of an experiment performed to examine an influence of a distance between the fixing belt 301 and the cover member 500 on power reduction. In the experiment, in order to easily compare the influence of the distance on the power reduction, the examination was conducted in a state where the steering roller 308 was fixed at the pivot.

In addition, in the experiment, the examination was conducted with three cover members each being prototyped in such a manner that the distance between the fixing belt 301 and the cover member 500 is uniform from the heating roller facing portion L1 to the steering roller facing portion L2. That is, a cover member with a distance of 3 mm was prepared as Comparative Example 1, a cover member with a distance of 5 mm was prepared as Comparative Example 2, and a cover member with a distance of 8 mm was prepared as Comparative Example 3. In addition, the power required at the time of performing a temperature control so that the surface temperature became 180° C. while the fixing belt 301 rotated at 300 mm/s was measured, and it was confirmed how much the power could be reduced as compared to the required power in a case where no cover member was provided. At this time, the required power in Comparative Example 1 was 420 W.

As is clear from FIG. 5, it has been found that the power reduction effect is greater when the distance between the fixing belt 301 and the cover member 500 is shorter. As a result of investigating the reason, it has been found that, as the distance between the fixing belt 301 and the cover member 500 is shorter, the space temperature between the fixing belt 301 and the cover member 500 is higher, causing a greater heat insulating effect.

Next, concerning the configuration in which the steering roller 308 tilts as in the present embodiment, the above-described experiment was performed using the cover member 500 (Example) illustrated in FIG. 4 to confirm the power reduction effect. Upon measuring the power required at the time of performing a temperature control so that the surface temperature becomes 180° C., the power reduction amount was 162 W. The experimental results of Comparative Examples 1 to 3 and Example described above are shown in FIG. 6. In FIG. 6, it was confirmed whether the fixing belt 301 and the cover member 500 were brought into contact with each other when the steering roller 308 was configured to tilt in each of Comparative Examples 1 to 3 as well, in addition to the power reduction effect. Since the distance between the cover member and the fixing belt was 3 mm in Comparative Example 1, and the distance between the cover member and the fixing belt was 5 mm in Comparative Example 2, in the configuration in which the tilting distance of the steering roller 308 was a maximum of 5 mm, the fixing belt was brought into contact with the cover member. In each of Comparative Example 3 and Example, the fixing belt was not brought into contact with the cover member. As can be seen from FIG. 6, the configuration of the embodiment causes a great power reduction effect while the fixing belt 301 and the cover member 500 are not in contact with each other.

Note that, as the distance between the fixing belt 301 and the cover member 500 is shorter, the space temperature between the fixing belt 301 and the cover member 500 is higher, and heat radiation from the fixing belt 301 can be further suppressed, resulting in a greater power reduction effect. Even if the distance between the fixing belt 301 and the cover member 500 is set to, for example, 30 mm to a certain extent, there is a heat radiation suppressing effect. However, as is clear from FIG. 5, as the distance between the fixing belt 301 and the cover member 500 is longer, the power reduction effect is smaller. Therefore, in the present embodiment, the distance between the fixing belt 301 and the cover member 500 is set to 10 mm or less, preferably 8 mm or less.

On the other hand, although a greater power reduction effect can be obtained as the distance between the fixing belt 301 and the cover member 500 is smaller, if the distance is too small, the fixing belt 301 and the cover member 500 may come into contact with each other even in a region deviated from the region where the steering roller 308 tilts. Therefore, the distance between the fixing belt 301 and the cover member 500 is preferably a minimum of 1 mm. In the present embodiment, the distance between the fixing belt 301 and the cover member 500 is set to 1 mm or more, preferably 3 mm or more.

Influence of Coverage of Cover Member with Respect to Fixing Belt

Figure 7:
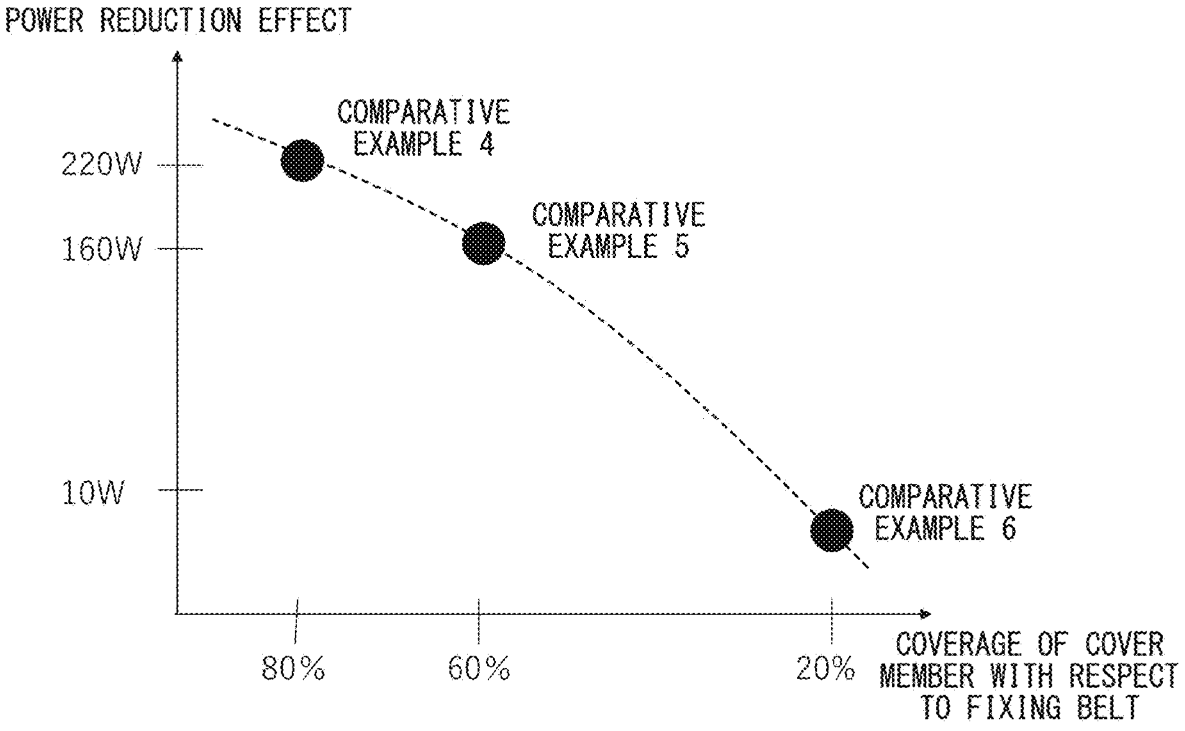
FIG. 7 is a graph illustrating a relationship of a coverage of the cover member with respect to the fixing belt with a power reduction amount.

Next, a relationship of a coverage of the cover member 500 with respect to the fixing belt 301, that is, a ratio of the cover member 500 covering the periphery of the fixing belt 301 with respect to the entire periphery of the fixing belt 301, with a power reduction effect will be described. FIG. 7 is a graph illustrating a result of an experiment performed to examine an influence of a coverage of the cover member 500 with respect to the fixing belt 301 on power reduction. Here, the coverage is a ratio of an area that the cover member 500 faces to an area of the entire circumferential length of the fixing belt 301 excluding the nip portion N.

In the experiment, in order to easily compare the influence of the coverage on the power reduction, the examination was conducted in a state where the steering roller 308 was fixed at the pivot. In addition, the examination was conducted with three cover members prototyped to have different coverages. That is, a cover member having a coverage of 80% was prepared as Comparative Example 4, a cover member having a coverage of 60% was prepared as Comparative Example 5, and a cover member having a coverage of 20% was prepared as Comparative Example 6. In addition, in each of Comparative Examples 4 to 6, the distance between the fixing belt 301 and the cover member 500 was set to a uniform distance from the heating roller facing portion L1 to the steering roller facing portion L2, which was 5 mm.

In addition, the power required at the time of performing a temperature control so that the surface temperature became 180° C. while the fixing belt 301 rotated at 300 mm/s was measured, and it was confirmed how much the power could be reduced as compared to the required power in a case where no cover member was provided.

As is clear from FIG. 7, it has been found that the power reduction effect is greater when the coverage of the cover member 500 with respect to the fixing belt 301 is larger. This means that even if there is a shaft or an auxiliary member disposed in design at a portion facing the outer peripheral surface of the fixing belt 301, if the coverage of the cover member 500 with respect to the fixing belt 301 is small, the power reduction effect is hardly obtained. Therefore, in order to obtain the power reduction effect, it is preferable to set the coverage of the cover member with respect to the fixing belt 301 to 25% or more.

As described above, it is preferable that the coverage of the fixing belt 301 covered by the cover member 500 is larger. This is because, as the coverage is larger, the space temperature between the fixing belt 301 and the cover member 500 is higher, making it possible to suppress heat radiation. Even when the coverage is small, for example, 10%, there is a slight effect. However, as is clear from FIG. 7, as the coverage is smaller, the power reduction effect is smaller. Therefore, in the present embodiment, the coverage of the fixing belt 301 covered by the cover member 500 is set to 25% or more, preferably 50% or more, and more preferably 60% or more. On the other hand, if the coverage is too large, there is a possibility that the cover member 500 comes into contact with the recording material P passing through the nip portion N. Therefore, the coverage is preferably 80% or less.

In the present embodiment, even in a configuration in which a belt member such as the fixing belt 301 is adopted for the fixing device 8, the heat radiation of the belt member can be suppressed. That is, the shifted position of the fixing belt 301 is controlled by tilting the steering roller 308. Therefore, if the cover member 500 for suppressing the heat radiation of the fixing belt 301 is too close to the fixing belt 301, the cover member 500 may come into contact with the fixing belt 301. On the other hand, when the cover member 500 is disposed away from the fixing belt 301, the heat radiation suppressing effect is reduced.

Therefore, in the present embodiment, the cover member 500 is disposed near the fixing belt 301 in such a manner that the average distance t2 between the second region β stretched by the steering roller 308 and the cover member 500 is larger than the average distance t1 between the first region α stretched by the heating roller 307 that heats the fixing belt 301 and the cover member 500. As a result, even though the steering roller 308 tilts, the heat radiation of the fixing belt 301 can be suppressed while preventing the cover member 500 from coming into contact with the fixing belt 301. Accordingly, the power saving of the fixing device 8 can be achieved.

Other Embodiments

In the above-described embodiment, the configuration in which the fixing pad 303 is provided as a contact member inside the fixing belt 301 in order to form a nip portion between the fixing belt 301 and the pressure roller 305 has been described. However, the contact member is not limited to the fixing pad 303, and may be a roller member or the like. The method of heating the fixing belt 301 is not limited to the halogen heater 306 inside the heating roller 307, and another means such as one using an electromagnetic induction method or one using a ceramic heater may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-115502, filed Jul. 13, 2023, which is hereby incorporated by reference herein in its entirety.

What is claimed is:

1. A fixing device that fixes a toner image to a recording material by heating the toner image borne on the recording material, the fixing device comprising:

- a rotatable endless belt member;
- a heating roller disposed inside the belt member, and configured to stretch the belt member and heat the belt member;
- a steering roller disposed inside the belt member, and configured to stretch the belt member together with the heating roller and control a position of the belt member with respect to a rotation axis direction of the heating roller by tilting with respect to the rotation axis direction;

a nip portion forming member contacting an outer peripheral surface of the belt member, and configured to form a nip portion for nipping and conveying the recording material between the nip portion forming member and the belt member; and a cover member disposed with a gap from the belt member in such a manner as to cover a part of an outer side of the belt member, wherein the belt member has a region in which a distance from the cover member changes in a case where the steering roller tilts with respect to the heating roller and the region includes a first stretched region stretched by the steering roller and a second stretched region stretched by the heating roller, and wherein, in a cross-section orthogonal to a rotational axis of the heating roller, in a state where a first virtual line is defined as a line passing through a rotation center of the steering roller and being parallel to a tilting direction of the steering roller, a point P is defined as a point where the first virtual line crosses an inner surface of the cover member above the belt member, and a point Q is defined as a closest point on the belt member from the point P, the cover member is disposed in such a manner that a length of a line segment PQ between the point P and the point Q is a first length when the steering roller is parallel to the heating roller and an average distance between the cover member and the second stretched region is a second length that is shorter than the first length.

2. The fixing device according to claim 1, wherein the cover member is disposed in such a manner that a distance between the cover member and the belt member in a position where the distance between the cover member and the belt member is largest is 10 mm or less when the steering roller is parallel to the heating roller.

3. The fixing device according to claim 1, wherein the cover member is constituted by one or more members disposed to cover ¼ or more of a circumferential length of the belt member.

4. The fixing device according to claim 1, wherein the region includes a third stretched region disposed between the first stretched region and the second stretched region in a rotation direction of the belt member, the cover member has a first portion facing the first stretched region, a second portion facing the second stretched region, and a third portion facing the third stretched region, the third portion being inclined with respect to the outer peripheral surface of the belt member in such a manner that, in a cross section orthogonal to the rotation axis direction of the heating roller, a distance from the belt member to the third portion increases as the third portion goes in a direction from the second portion toward the first portion.

5. The fixing device according to claim 1, wherein the nip portion forming member is a pressure roller pressed against the belt member.

6. The fixing device according to claim 1, further comprising:

a contact member disposed at a position facing the nip portion forming member with the belt member interposed therebetween inside the belt member, the contact member being in contact with an inner peripheral surface of the belt member.

7. The fixing device according to claim 1, wherein the cover member is larger than the belt member in the rotation axis direction.

8. The fixing device according to claim 1, wherein the cover member is disposed in such a manner that an average distance between the cover member and the first stretched region is larger than an average distance between the cover member and the second stretched region.

9. The fixing device according to claim 1, wherein a position of the belt member where the distance between the cover member and the belt member in the first stretched region is larger than the distance between the cover member and the belt member in the second stretched region in the case where the steering roller is parallel to the heating roller is a position of the belt member stretched by the steering roller at a position at which the steering roller tilts most in a case where the steering roller tilts most.

10. The fixing device according to claim 1, wherein, in the cross-section, in a state where a second virtual line is defined as a line passing through the rotation center of the steering roller and orthogonal to the first virtual line, a point S is defined as a point where the second virtual line crosses a surface of the cover member that faces the first stretched region, and a point T is defined as a point where the second virtual line crosses the first stretched region when the steering roller is parallel to the heating roller, the cover member is disposed in such a manner that a length of a line segment ST between the point S and the point T is a third length that is shorter than the first length.

* * * * *